Patented Oct. 11, 1938

2,132,408

UNITED STATES PATENT OFFICE 2,132,408

PROCESS FOR THE PRODUCTION OF MAGNESIUM OR ALLOYS THEREOF

Daniel Gardner, Rueil-Malmaison, France, assignor to Studien und Verwertungs-Aktiengesellschaft, Neuhausen, Switzerland, a joint-stock company of Switzerland No Drawing. Application December 12, 1936, Serial No. 115,540. In Great Britain December 23, 1935

5 Claims. (Cl. 75—67)

This invention relates to a process for the production of magnesium or alloys thereof in metallic state.

It has been shown that nitrogen has an affinity for magnesium and that the absorption of nitrogen by magnesium starts at 780° C., whereby magnesium nitride, $Mg_3N_2$, is formed, the reaction being understood to be facilitated by the presence of catalysts, such as copper oxide.

It has also been proposed to convert magnesium oxide into the nitride at high temperatures by the action of carbon and nitrogen, the reaction being expressed by the following equation:

$$3MgO + 3C + N_2 \rightarrow Mg_3N_2 + 3CO$$

and from the nitride thus formed to obtain metallic magnesium by the action of certain metals as ferrosilicon. The production of magnesium by these methods on an industrial scale has not however proved possible.

Hitherto the chief use of magnesium nitride has been for the production of ammonia, the nitride undergoing hydrolysis by the action of water. This reaction is expressed by the following equation:

$$Mg_3N_2 + 6H_2O \rightarrow 3Mg(OH)_2 + 2NH_3$$

The present invention for its object to utilize magnesium nitride for the production of metallic magnesium. For this purpose according to the present invention a process for the production of magnesium consists in heating magnesium nitride to a temperature above the vaporization point 1120° C. of magnesium, for example about 1600° C., sufficient to decompose it into vaporous magnesium and gaseous nitrogen, in the presence of a substance which immediately combines with and binds the nitrogen so liberated and thus removes it from the sphere of reaction and prevents its re-combination with the metallic magnesium at lower temperatures.

When heated to or above a dissociation temperature of 1500° and preferably about 1600° C., magnesium nitride decomposes, but the metallic magnesium liberated tends to combine at once with the nitrogen in the cooler zones of the furnace in which the treatment is carried out unless special precautions be taken to prevent this.

The process according to the present invention utilizes the described affinity of nitrogen for magnesium for the industrial production of magnesium. Thus in carrying out the present process magnesium nitride $Mg_3N_2$ is heated to the decomposition temperature, and to bind the free nitrogen there is introduced into the sphere of reaction substances, such as calcium compounds, which readily combine with the nitrogen to form nitrides which melt considerably below the decomposition temperature of magnesium nitride. For example the magnesium nitride may be heated to its decomposition temperature in the presence of calcium carbide or calcium silicide, whereby there is formed calcium nitride, which has a melting point of about 900° C. which permits of its easy gradual removal, and metallic magnesium, which latter is distilled off in a current of gas that is inert towards the magnesium, and is collected in vacuo or in an atmosphere of hydrogen, or an inert gas such as argon, or other gas that has no action on liquid or vapourized magnesium. Alternatively the magnesium nitride may be heated in an atmosphere of hydrogen in large excess, whereby metallic magnesium and ammonia are formed.

The magnesium produced by the present process is obtained in a high state of purity and, if desired, can be directly combined with other metals, such as for example aluminium or beryllium, to form magnesium alloys.

The magnesium nitride can be obtained by passing nitrogen through a powdered mixture of a magnesium compound with a carbonaceous reducing agent at a high temperature, preferably above 1000° C., so as to form magnesium nitride, the reaction being effected in an atmosphere free from moisture.

The present process is applicable to the production of magnesium from practically all magnesium ores and salts of magnesium. The presence of combined sulphur or combined chlorine in the ingredients facilitates the decomposition of the magnesium nitride by the formation of ammonium sulphide or chloride, and in addition to the calcium carbide or silicide there may also be added suitable fluxes such as aluminium fluoride or magnesium fluoride that facilitate the formation of liquid slags to render them easily removable.

The process can easily be regulated so as to operate in a continuous manner.

I claim:

1. The process of producing metallic magnesium or its alloys which comprises heating magnesium nitride $Mg_3N_2$ to a decomposition temperature of about 1600° C. thereby to dissociate it into its elements vaporous magnesium and nitrogen, and reacting the mixed vapors with an agent that readily combines selectively with the free nitrogen thereby holding the nitrogen against recombination, at or below such decomposition temperature, with the magnesium; and condensing the vaporous magnesium and collecting it in metallic form separately from the remaining products of the reaction; the nitrogen-combining agent being one or more of the group consisting of calcium carbide and calcium silicide and hydrogen gas in excess.

2. The process of producing metallic magnesium or its alloys which comprises heating magnesium nitride $Mg_3N_2$ to at least is decomposition temperature thereby to dissociate it into its elements vaporous magnesium and gaseous nitrogen, and reacting such gases with a binding agent, namely, of the group consisting of calcium carbide and calcium silicide, which readily combines with the released nitrogen to form molten calcium nitride which vaporizes only well above and solidifies only well below such decomposition temperature, thereby holding the nitrogen against recombination, at or below such decomposition temperature, with the magnesium; and separating the magnesium vapor from the remaining products of the reaction and condensing it in metallic form.

3. The process of claim 2 and wherein the reaction is effected in an atmosphere at pressure substantially not above normal of a gas that is non-reactive with the magnesium vapor.

4. The process of claim 2 and wherein the reaction is effected in an atmosphere at pressure substantially not above normal of a gas that is non-reactive with the magnesium vapor, and the gas is maintained in flow from the reaction zone to the place of condensation.

5. The process of producing metallic magnesium or its alloys which comprises heating magnesium nitride $Mg_3N_2$ to at least its decomposition temperature thereby to dissociate it into its elements vaporous magnesium and nitrogen, while maintaining in the reaction zone an atmosphere of hydrogen in large excess, thereby to cause the released nitrogen to combine with the hydrogen as ammonia and thus to bind the nitrogen against recombination at or below such decomposition temperature with the magnesium; removing the magnesium vapors from the reaction zone, and condensing them in metallic form, separate from the ammonia.

DANIEL GARDNER.